(12) United States Patent
Schmidt et al.

(10) Patent No.: US 11,343,693 B2
(45) Date of Patent: May 24, 2022

(54) ENHANCEMENT OF MDT SERVICES

(71) Applicant: IPCom GmbH & Co. KG, Pullach (DE)

(72) Inventors: Andreas Schmidt, Braunschweig (DE); Achim Luft, Braunschweig (DE); Maik Bienas, Schoeppenstedt (DE); Martin Hans, Bad Salzdetfurth (DE)

(73) Assignee: IPCOM GMBH & CO. KG, Pullach (DE)

( * ) Notice: Subject to any disclaimer, the term of this patent is extended or adjusted under 35 U.S.C. 154(b) by 0 days.

(21) Appl. No.: 15/772,419

(22) PCT Filed: Nov. 4, 2016

(86) PCT No.: PCT/EP2016/076679
§ 371 (c)(1),
(2) Date: Apr. 30, 2018

(87) PCT Pub. No.: WO2017/077039
PCT Pub. Date: May 11, 2017

(65) Prior Publication Data
US 2018/0324617 A1    Nov. 8, 2018

(30) Foreign Application Priority Data
Nov. 6, 2015 (EP) .................................... 15193483

(51) Int. Cl.
*H04W 24/10* (2009.01)
*H04L 47/2483* (2022.01)
(Continued)

(52) U.S. Cl.
CPC ........... *H04W 24/10* (2013.01); *H04L 43/062* (2013.01); *H04L 47/2483* (2013.01);
(Continued)

(58) Field of Classification Search
None
See application file for complete search history.

(56) References Cited

U.S. PATENT DOCUMENTS

| 2013/0090113 A1 | 4/2013 | Persson et al. |
| 2014/0113656 A1 | 4/2014 | Schmidt et al. |

(Continued)

FOREIGN PATENT DOCUMENTS

| EP | 2360960 A2 | 8/2011 |
| EP | 2763455 A1 | 8/2014 |

(Continued)

OTHER PUBLICATIONS

International Search Report and Written Opinion of International Application No. PCT/EP2016/076679, dated Feb. 27, 2017.

(Continued)

*Primary Examiner* — Kenny S Lin
(74) *Attorney, Agent, or Firm* — Marshall, Gerstein & Borun LLP

(57) ABSTRACT

A method for a user equipment, UE, device to perform measurements in order to assess network performance, including minimization of drive test, MDT, measurements. Configuration information is received at the UE, the configuration information providing information for controlling service specific measurements and for controlling tagging of measurement reports by the UE with at least one of a service flow identifier and an indication that the measurement relates to one of a single service data flow and a multiplicity of service data flows.

15 Claims, 10 Drawing Sheets

(51) Int. Cl.
*H04L 43/062* (2022.01)
*H04W 24/02* (2009.01)
*H04W 24/08* (2009.01)
*H04W 76/27* (2018.01)

(52) U.S. Cl.
CPC .......... *H04W 24/02* (2013.01); *H04W 24/08* (2013.01); *H04W 76/27* (2018.02)

(56) References Cited

U.S. PATENT DOCUMENTS

| | | | | |
|---|---|---|---|---|
| 2014/0126363 A1* | 5/2014 | Zeng | ..................... | H04W 28/12 370/230 |
| 2014/0228017 A1* | 8/2014 | Chang | ................... | H04W 24/10 455/422.1 |
| 2015/0092579 A1* | 4/2015 | Li | ......................... | H04W 24/10 370/252 |
| 2015/0215840 A1* | 7/2015 | Yiu | ....................... | H04W 80/08 370/329 |
| 2015/0289141 A1* | 10/2015 | Ghasemzadeh | ....... | H04W 16/14 370/330 |
| 2016/0219465 A1* | 7/2016 | Lei | ..................... | H04W 36/0022 |
| 2016/0309379 A1* | 10/2016 | Pelletier | ................ | H04W 76/27 |
| 2016/0353318 A1* | 12/2016 | Liu | ......................... | H04L 41/00 |
| 2017/0374579 A1* | 12/2017 | Wang | ................ | H04W 28/0278 |
| 2019/0007855 A1* | 1/2019 | Lee | ......................... | H04W 24/10 |
| 2020/0112873 A1* | 4/2020 | Zhu | ......................... | H04W 76/27 |

FOREIGN PATENT DOCUMENTS

| | | |
|---|---|---|
| WO | WO-2012110054 A1 | 8/2012 |
| WO | WO-2013066679 A1 | 5/2013 |

OTHER PUBLICATIONS

3rd Generation Partnership Project; Technical Specification Group Services and System Aspects; Telecommunication management; Performance Management (PM); Performance measrements Evoved Packet Core (EPC) netword (Release 12), 3GPP Standard; 3GPP TS 32.426, Mobile Competence Centre; 650, Route De Lucioles; F-06921 Sophia-Antipolis Cedex; France, vol. SA WG, No. V12. 0.0, pp. 1-84, XP050926493, Oct. 2, 2014.

* cited by examiner

ENHANCEMENT OF MDT SERVICES

CROSS-REFERENCE TO RELATED APPLICATIONS

This is the United States national phase of International Patent Application No. PCT/EP2016/076679, filed Nov. 4, 2016, which claims the priority benefit of European Application No. 15193483.3, filed on Nov. 6, 2015. The entire contents of each of the foregoing are incorporated herein by reference.

FIELD OF THE DISCLOSURE

The present invention relates to measurements performed in connection with the so-called minimization of drive tests (MDT) feature introduced in respect of mobile communication and in particular the standards promulgated by the 3GPP organization, for example in the version known as "Release 10", or "Rel-10".

BACKGROUND

As an example, EP 2 763 455 A1 describes a mobile communication method supporting MDT.

In a state RRC_CONNECTED a radio resource control (RRC) connection has been established for the transfer of data to/from a user equipment device (UE) and mobility of a UE is infrastructure controlled and UE assisted. That means based on measurements collected by and received from the UE the infrastructure side may trigger handover from one base station (evolved Node B, eNB) to another.

In a state RRC_IDLE mobility is solely under control of the UE. That means based on measurements collected by the UE, the UE itself continuously checks whether there are radio cells around that are better suited for the UE to camp on. A UE in RRC_IDLE is required to inform the infrastructure from time to time about changes of its tracking area (in order to guarantee reachability in case of paging).

Details about the UE states in LTE and state transitions (including inter-RAT aspects) can be found in section 4.2 of 3GPP TS 36.331.

Referring to 3GPP TS 36.300, FIGS. 13.1-1, an EPS bearer/E-RAB is the level of granularity for bearer level QoS control in the EPC/E-UTRAN. That is, Service Data Flows (SDFs) mapped to the same EPS bearer receive the same bearer level packet forwarding treatment (e.g. scheduling policy, queue management policy, rate shaping policy, RLC configuration, etc.).

SDF refers to a group of IP flows associated with a service that a user is using, while an EPS bearer refers to IP flows of aggregated SDFs that have the same QoS (Quality of Service) class, e.g. Conversational, Real Time Streaming or Best Effort. 3GPP TS 23.203 contains a list of standardized QoS Class Identifiers (QCIs) and corresponding example services (cf. Table 1).

One EPS bearer/E-RAB is established when the UE connects to a Packet Data Network (PDN), and this bearer remains established throughout the lifetime of the PDN connection to provide the UE with always-on IP connectivity to that PDN. That bearer is referred to as the default bearer. Any additional EPS bearer/E-RAB that is established to the same PDN is referred to as a dedicated bearer. The initial bearer level QoS parameter values of the default bearer are assigned by the network, based on subscription data. The decision to establish or modify a dedicated bearer can only be taken by the EPC, and the bearer level QoS parameter values are always assigned by the EPC.

An EPS bearer/E-RAB is referred to as a GBR bearer if dedicated network resources related to a guaranteed bit rate (GBR) value that is associated with the EPS bearer/E-RAB are permanently allocated (e.g. by an admission control function in the eNB) at bearer establishment/modification. Otherwise, an EPS bearer/E-RAB is referred to as a Non-GBR bearer. A dedicated bearer can either be a GBR or a Non-GBR bearer while a default bearer shall be a Non-GBR bearer.

Table 1 shows the standardized quality of service (QoS) class identifiers (QCI) characteristics for GBR and non-GBR connections in a simplified form, without push-to-talk and mission critical signalling and data characteristics.

TABLE 1

| QCI | Resource Type | Priority Level | Packet Delay Budget | Packet Error Loss Rate (NOTE 2) | Example Services |
|---|---|---|---|---|---|
| 1 | GBR | 2 | 100 ms | $10^{-2}$ | Conversational Voice |
| 2 | | 4 | 150 ms | $10^{-3}$ | Conversational Video (Live Streaming) |
| 3 | | 3 | 50 ms | $10^{-3}$ | Real Time Gaming |
| 4 | | 5 | 300 ms | $10^{-6}$ | Non-Conversational Video (Buffered Streaming) |
| 5 | Non-GBR | 1 | 100 ms | $10^{-6}$ | IMS Signalling |
| 6 | | 6 | 300 ms | $10^{-6}$ | Video (Buffered Streaming) TCP-based (e.g., www, e-mail, chat, ftp, p2p file sharing, progressive video, etc.) |
| 7 | | 7 | 100 ms | $10^{-3}$ | Voice, Video (Live Streaming) Interactive Gaming |
| 8 | | 8 | 300 ms | $10^{-6}$ | Video (Buffered Streaming) |
| 9 | | 9 | | | TCP-based (e.g., www, e-mail, chat, ftp, p2p file sharing, progressive video, etc.) |

Minimization of Drive Tests (MDT) is a feature introduced in 3GPP Rel-10 that enables operators to utilize users' equipment to collect radio measurements and associated location information, in order to assess network performance while reducing the operational expenditure, OPEX, associated with traditional drive tests. So, in contrast to the usual measurement configuration for Radio Resource Management (RRM) purposes, with MDT the network is enabled to configure measurements that do not relate to the maintenance of an on-going connection between eNodeB and UE. Instead, MDT configures the UE for measurement collection and related reporting that suits the operator's long-term network management. The focus of MDT in Rel-10 was coverage optimization. However, in the increasingly complex wireless packet data networks of today, performance is affected by many different factors and cannot easily be estimated by simple radio measurements. Therefore, in 3GPP Rel-11, MDT was enhanced in order to provide a more complete view of network performance by adding Quality of Service (QoS) verification to the focus of MDT.

3GPP TS 37.320 defines two flavours of MDT: Immediate-MDT and Logged-MDT. The former allows MDT configuration and reporting while the UE is residing in RRC_CONNECTED mode of operation. Reporting of MDT measurements is part of the normal RRM reporting mechanisms performed continuously. In the latter one, the UE is configured for measurement collection while being in RRC_IDLE and reporting at a later point in time (after it has returned to RRC_CONNECTED mode of operation again). The minimum requirement regarding the memory size for the storage of MDT Log-Files in UEs is 64 kB. An MDT Log-File may contain a list of measurements (such as RSRP/RSRQ values of the cell the UE is camping on as well as some measurements collected on inter-frequency and inter-RAT neighbour cells) plus corresponding time and location stamps.

As mentioned above, Rel-11 MDT aimed at defining methods in context of QoS verification. The work on measuring end user QoS focused on the measurement of bit rate for non-GBR type of data statistics only. However, besides non-GBR traffics, some GBR traffics (such as multimedia telephony, MMTEL, voice/video, as described later) are about to be introduced in many Mobile Network Operators' wireless networks. Similar to other typical services provided by Mobile Network Operators, MMTEL voice/video will continuously need to be monitored and (if needed) optimised specifically. As part of its on-going work on Rel-13, 3GPP RAN2 is currently in a process of investigating whether the MDT functionality as currently defined can efficiently support MMTEL voice/video type traffic statistics or not. First results of this study indicate that the current MDT functionality might not be fully sufficient.

The core network functionality for the configuration of MDT (comprising instructions what kind of devices should be selected for MDT measurements by the eNB, and where the collected MDT reports should be sent to) is based on the existing trace functionality as described in 3GPP TS 32.422. FIG. 4.1.2.12.2 of this document forms the basis for FIG. 1 which shows how trace-based MDT configuration is first propagated from an element manager, EM, to an eNB and then passed over the air interface to a UE where a first set of MDT measurements is collected. Steps #1 through #3 indicate "Storage of Trace Control and Configuration Parameters" in the respective entity. Step #4 indicates "Start Trace Recording Session" by the eNB (i.e. some MDT measurements may be collected by the eNB right after step 4 has been accomplished). The eNB may then choose to configure UEs based on the MDT Configuration it has received from the EM. For this, a pair of "RRC Connection Reconfiguration"/"RRC Connection Reconfiguration Complete" RRC Messages may be used for each such UE. Step #5 represents "Collection of MDT Measurements by the UE".

The eNB is also responsible for the collection of MDT measurements from the respective UE. The UE may send the measurements it has collected in the scope of MDT to the eNB as part of the normal RRM measurement reporting procedure. This procedure is illustrated in FIG. 2 derived from TS 32.422. As shown in FIG. 2, a step #6 the eNB may combine MDT measurements received from a selected UE (i.e. measurements that were collected inside a UE) with MDT measurements that were collected on eNB side for the same UE, e.g. in uplink direction. In step #6 the eNB may also save MDT logs to Trace records. After that, the eNB uses trace-based MDT reporting mechanisms to convey the MDT reports (e.g., in form of Trace records) back to the trace collection entity, TCE ("MDT Server"). This may happen either directly or via the EM.

3GPP TS 32.421 and TS 32.422 collectively describe a so-called "trace feature".

The trace feature may be used (e.g., in the scope of MDT) to convey radio measurements to the element manager, EM, and/or to the trace collection entity, TCE, as described above. Besides this special task that is solved using trace, the feature has the following general use in the whole network.

With the trace feature the mobile network is enabled to obtain a copy of all signalling messages belonging to a specific subscriber that are exchanged between the following entities: HSS, MME, S-GW, and P-GW. These network entities can be configured by the Element Manager (EM) to forward (i.e. copy) specific signalling messages to the TCE. Such configuration messages are for example sent during "UE attach" procedure from MME to S-GW and from S-GW to P-GW.

FIG. 3, which is a reproduction of FIG. 4.1.2.10.1 of 3GPP TS 32.422, shows how a so called trace session may be configured and started in the serving gateway (SGW or S-GW) and packet data network gateway (PGW or P-GW) from the mobility management entity (MME) in the Create Session Request Messages. The message is triggered by a UE requesting to be attached to the network and being allocated a first "default" bearer.

The trace configuration is propagated from the SGW to the PGW together with the UE-specific configuration for bearer setup and other information.

For completeness of understanding FIG. 3, it should be mentioned that the trace functionality is originally triggered by the trace server (EMS in this case) via the home subscriber server, HSS (operator's subscriber data base), because the typical trace initiated is either location based (trace in a certain area) or subscriber based (trace a specific subscriber) and the operator's subscriber data base is the first entry point that has the information which subscriber is currently located where or which MME serves a certain area. The MME then propagates the trace session to the respective network entities: SGW, PGW and eNB.

MMTel referred to above is a global standard based on the IMS (IP Multimedia Subsystem), offering converged, fixed and mobile real-time multimedia communication using the media capabilities such as voice, real-time video, text, file transfer and sharing of pictures, audio and video clips. It also combines communication services with presence service. As described in 3GPP TS 24.173 (IMS multimedia telephony communication service and supplementary services), MMTEL consists of two principal parts: a basic communication part, and an optional supplementary services part. The service is highly dynamic in terms of media component usage: the protocols allow a communication session to start with one or more media components, and components can then be added and/or removed during the communication session. From an access stratum (AS) point of view, the dynamic nature of MMTEL traffic means that several radio bearers (RBs) with different QCIs belonging to the same MMTEL session—as well as the actual number of active RBs—may change in the course of one MMTEL call.

A mobile communication system may allow coupling of different radio access technologies (RATS) to a common core network (CN). In early releases of the LTE system a subscriber was not able to communicate using multiple access systems (for example, a cellular radio interface and a WiFi radio interface) simultaneously. The subscriber could only establish one or more PDN connections and all traffic generated and/or consumed by the subscriber was routed through the same access system (=RAT), regardless of the PDN connection it belonged to. Then, mobility enhancements to support session continuity for any application between 3GPP access and WLAN access were introduced in the scope of the so-called "3GPP Wireless Local Area Network Interworking (I-WLAN)" work item. But dynamic switching/distribution of IP flows was still not possible.

Today mobile devices with multiple wireless interfaces (e.g. 3GPP, WLAN, etc.) are becoming commonly available and the set of applications running in the mobile devices is very diversified. Some applications are better suited to run over a first access system (e.g., a 3GPP access system) while other applications are better suited to run over a second (e.g., a non-3GPP access system) complementary access systems. File transfer with ftp via WiFi in parallel to VoIP over LTE would represent a use case for this.

In order to address these new scenarios, 3GPP has been looking into IP flow mobility solutions, i.e. possibilities to route IP traffic flows (generated and/or consumed by the same or different applications) dynamically via specific access systems. Details about this endeavour can be found in 3GPP TS 23.861.

According to 3GPP Rel-12 MDT enables collection of "Scheduled IP Throughput" measurements per RB in the eNB (in both uplink and downlink direction). QCI values of the corresponding RBs may be added to the measurement results, too. As different types of services may occur at the same time (or at least overlap for some period of time), it is also thinkable that two (or more) different types of services share the same QCI, as depicted in FIG. 4. As an example, FIG. 4 shows different SDFs with varying QCIs overlapping in time. As shown, SDF#1 and SDF#4 with the same QCI overlap at least partially and because of the same QoS requirements, these can be mapped onto the same RB. Information describing the type of service being assigned to a particular RB is currently missing from MDT measurement results. The MDT measurement results only give the measured "Scheduled IP Throughput" per RB and may additionally indicate what QCI this RB was assigned to.

However, knowledge of the QCI alone is not sufficient to derive service-specific information from the set of MDT measurement results. Consequently, with existing techniques MMTel traffic cannot be measured in the scope of MDT (i.e. today's IP throughput measurement results always represent a mixture of different types of services).

Referring to FIG. 4, the type of service for each SDF could be as given by Table 2.

TABLE 2

| SDF | QCI | Type of Service |
|-----|-----|-----------------|
| 1 | 1 | Conversational Voice |
| 2 | 5 | IMS Signalling |
| 3 | 3 | Real Time Gaming |
| 4 | 1 | MMTel Voice |

As shown in Table 2, both SDF#1 and SDF#4 share the QCI "1" for conversational voice and MMTel voice respectively.

Different media components may be dynamically added and/or removed during one communication session. When different SDFs require the same CQI and are mapped on the same RB (like in the case of "MMTel Voice" in combination with "Conversational Voice", according to FIG. 4 and Table 2) it would be helpful to have service-specific MDT measurement triggers and/or reporting triggers (or, alternatively, service-specific events like start/stop indications in the report), because an RB will not cease to exist when one SDF (SDF #1 in the example above) becomes inactive (time point $t_c$ in FIG. 4).

Without knowledge of these service-specific triggers or events, one SDF cannot be measured and reported independently from another SDF and as such MMTEL traffic cannot be measured independently from other type(s) of GBR traffic with the same QoS requirements, resulting in inaccurate measurement samples.

These triggers are not known to any entity other than the UE and the P-GW, respectively.

Performance measurements on IP flows that may be dynamically transported over 3GPP access (e.g., the LTE Uu interface) and non-3GPP access systems (e.g., WiFi) may be falsified due to switching between different data paths in a heterogeneous access system environment. For meaningful evaluation at a later point in time measurements collected on IP flows over 3GPP access ("first access system") need to be distinguishable from those collected over non-3GPP access systems ("second access system").

WO 2012/110054 A1 describes service centric measurements for minimizing drive tests in which a UE generates test traffic in order to perform an active service specific measurement.

US 2014/0113656 describes the possibility of certain MDT measurements taking place in the core network, CN, and/or certain radio access network, RAN, nodes.

GENERAL DESCRIPTION

The present invention provides a method for a user equipment, UE, device to perform measurements in order to assess network performance, preferably minimization of drive test, MDT, measurements, the method comprising receiving configuration information at the UE, the configuration information providing information for controlling service specific measurements and for controlling tagging of measurement reports by the UE with at least one of a service flow identifier and an indication that the measurement relates to one of a single service data flow and a multiplicity of service data flows.

Preferably, the method comprises receiving a radio resource control configuration message including configuration information to provide service data flow specific measurements. The configuration information may be included within a measurement configuration information element.

Advantageously, the UE is triggered to report a radio bearer measurement when a particular event occurs, the event being one of an average data rate exceeding a threshold, an average data rate falling below a threshold, a buffer level exceeding a threshold and a buffer level falling below a threshold.

As an alternative, the method may comprise receiving configuration information in a session management message wherein, for example, the configuration information comprises a definition of measurements to be performed by the UE and a definition of reporting criteria. The reporting criteria may provide trigger information to report a radio bearer measurement when a particular event occurs, the event being one of an average data rate exceeding a threshold, an average data rate falling below a threshold, a buffer level exceeding a threshold and a buffer level falling below a threshold.

The configuration information may provide information on performing measurements in the event that multiple radio access technologies are employed. Further, the measurements may be tagged with at least one of a service data flow identifier and an indication that the measurement relates to either a single service data flow or multiple service data flows.

The invention also provides a core network equipment adapted to generate corresponding messages for instructing UEs to perform such MDT measurements.

In a further aspect, the invention provides a method for a user equipment, UE, device to perform measurements in a heterogeneous access system in order to assess network performance, preferably minimization of drive test, MDT, measurements, the method comprising receiving configuration information at the UE, the configuration information providing information for controlling service specific measurements, and performing the service data flow specific measurements, wherein the configuration information indicates which of a plurality of radio access technologies is to be used for the measurements.

A mobile core network equipment may itself be arranged to perform radio bearer measurements in order to assess network performance, in particular minimization of drive test, MDT, measurements, such that the measurements provide a service specific collection of measurements.

The invention still further provides a user equipment device adapted to perform radio bearer measurements in order to assess network performance, in particular minimization of drive test, MDT, measurements, such that the measurements provide a service specific collection of measurements.

The known MDT service and/or Trace functionality is enhanced as follows:
  MDT configuration is enhanced to allow for
    service-specific collection of measurements, and
    tagging of measurements results
      either with a list of service data flow identifiers, or
      simply indicating the measurement report to relate to single or multiple service data flows.
  An entity of the mobile core network (e.g., some kind of "evolved" EM) is enabled to configure the P-GW and UE for
    service-specific measurements.
    service-specific measurement events.
    event-based or regular service-specific measurement reporting.
  UE and P-GW are enabled to
    perform service-specific measurements
    detect service-specific measurement events
    report service-specific measurements either event-based or regularly (according to configuration).
  An entity of the mobile core network (e.g., some kind of "evolved" TCE) is enabled to collect and evaluate the service-specific measurements received from the UE and P-GW At present, the UE and the eNB provide measurements for MDT as the known measurements are radio access network related. UE and eNB are the two nodes that terminate the air interface and thus have the knowledge required for the configured measurements.

The present invention provides for service-level information to be part of the MDT measurements; consequently the respective terminating network nodes that have the knowledge about the different services within a single bearer become involved.

Therefore, service-specific MDT measurements are collected either
  by the corresponding UE (UE-based), and/or
  by the corresponding P-GW (P-GW-based).

The SDF properties as used in this invention, i.e. which flows are really distinguished in the MDT feature, are configured by the core network by way of traffic filters that will be re-used in this invention without further details.

Two alternative embodiments are provided:
  For service-specific MDT measurements an SDF identifier is or SDF identifiers are added to the measurements in an MDT report. If necessary, multiple measurement values are reported for multiple services where according to state of the art only a single value would have been included in a report.
  For tagging of MDT measurements information tags are generated for inclusion in the MDT measurements reports. The tags may contain a list of services (SDF identifiers) included in the reported single measurements. Alternatively, the tags may simply indicate to the TCE ("MDT Server") that a report is "pure" (single service relate to the report) or "combined" (or "mixed", multiple services relate to the report).

For the P-GW-based variant the messages for setup and modification of bearers are enhanced so that service-level MDT reporting is enabled. For the proposed enhancements, care is taken to not change the mobile network architecture more than necessary and re-use existing mechanism wherever possible. An alternative would be to define a new message that would allow configuration of service-level measurements in the P-GW independently of bearer setup and bearer modification. This is not described in detail in this invention for the sake of brevity.

For the UE-based variant enhancements to the existing configuration and reporting methods are also necessary to enable service-level reporting.

For the indication of services within a bearer the known SDF definition related to different services transported over a single bearer may be re-used (i.e. no new flow definition is required for this invention). The known SDF can for example distinguish flows up to a granularity of IP-5-Tupel (source IP address/port number, destination IP address/port number and the Transport Protocol in use), but it can also define flows only by the transport protocol, only by the destination IP-Address or by a range of TCP port numbers. However, another definition of services may be useful in future networks referencing other than the typical IP addressing and routing mechanisms.

In the light of dynamic IP flow distribution over various data paths in a heterogeneous radio access technology environment (e.g., a 3GPP compliant access, such as the LTE Uu interface, complemented with a non-3GPP access, such as WiFi), it is proposed to allow for at least one of the following:
  suppression of measurement collection, or
  tagging of measurement results
when
  multiple access systems are being used (or have been used) interchangeably, or
  the IP flow under investigation is/was switched from one access system to another access system.

The invention provides a number of benefits. For example, MDT measurement results for "Scheduled IP Throughput" no longer represent a mixture of several active services mapped to a particular radio bearer, as for QCI #1 in Table 3.

Instead, service-specific MDT measurements can be collected, or MDT measurements can be enhanced by a list of contained services or at least they can be tagged as "combined" MDT measurements so that they can be readily distinguished from "pure" MDT measurements.

TABLE 3

| QCI | Scheduled IP Throughput (in Mbit/s) |
|---|---|
| 1 | 0.78 |
| 5 | 1.3 |
| 3 | 0.2 |

Table 3 shows an example MDT measurement report for "Scheduled IP Throughput" measurements according to state-of-the-art. It does not contain any service specific information, only measurement results per QCI.

These enhancements enable the mobile network to monitor the performance of each individual service by each individual subscriber and even to adjust the network and radio resources dynamically to the current need (the resulting adjustment goes beyond the scope of MDT). This will increase the network efficiency and the user experience.

As an arbitrary example, the new service would enable the network operator to configure measurement and reporting of YouTube video streaming quality in a certain area so that he can analyse users' complains about bad quality of experience.

Furthermore, falsification of measurement results due to IP flow distribution over various data paths in a heterogeneous access system (e.g., a 3GPP compliant access, such as the LTE Uu interface, complemented with a non-3GPP access, such as WiFi) can be detected. In one embodiment the access system of interest can be selected (e.g., for collection of measurements and reporting). In yet another one embodiment collection of "poisoned" measurements can be suppressed prior to reporting.

BRIEF DESCRIPTION OF THE DRAWINGS

Preferred embodiments of the invention will now be described, by way of example only, with reference to the accompanying drawings in which.

DETAILED DESCRIPTION

Figure 5:
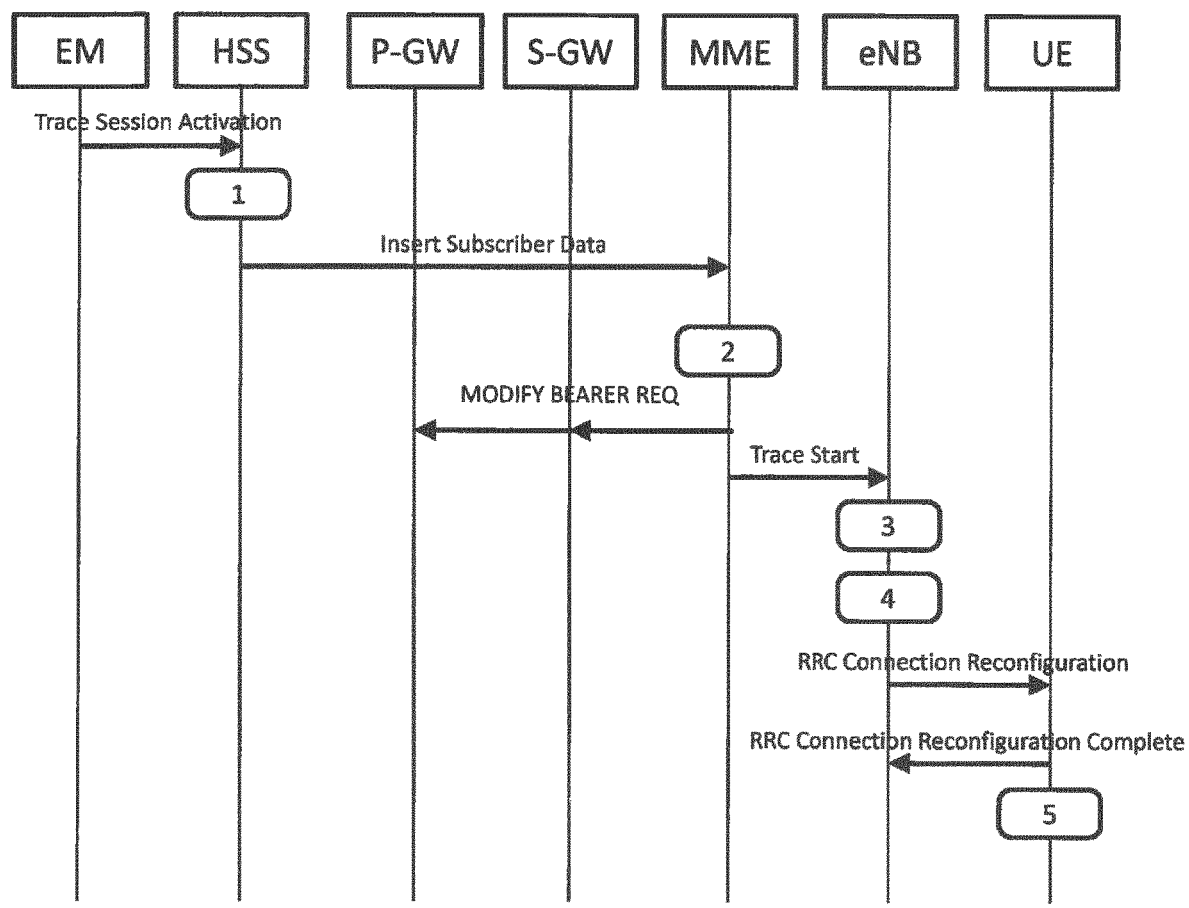
FIG. 5 shows a flow diagram of a first embodiment of the invention.

Referring now to FIG. 5, a trigger arrangement to configure MDT operation is shown which comes from the MDT Server or trace server, called element manager, EM, to the MME via the subscriber data base (HSS) that provides subscriber and location information. The MME can be understood as the central Core Network management entity that is triggering MDT operation for the sub-network it is managing.

Figure 1:
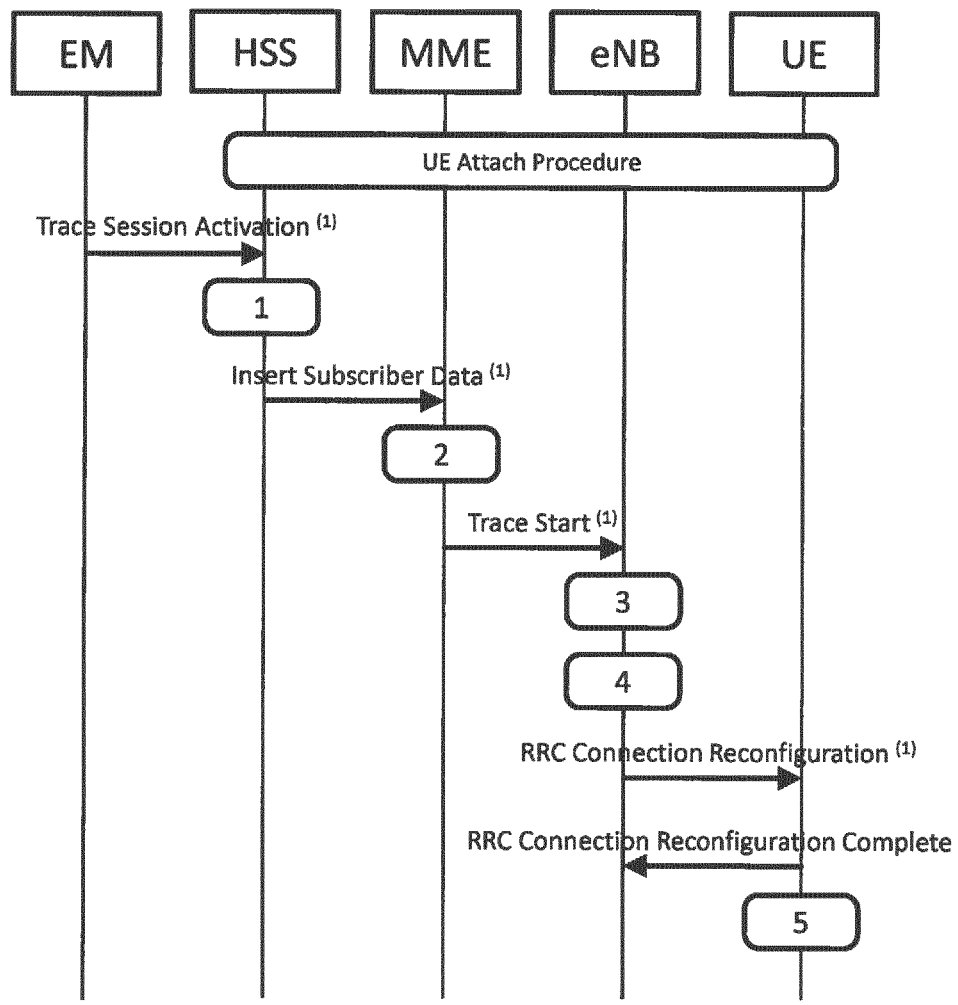
FIG. 1 shows a prior art MDT procedure.
Figure 2:
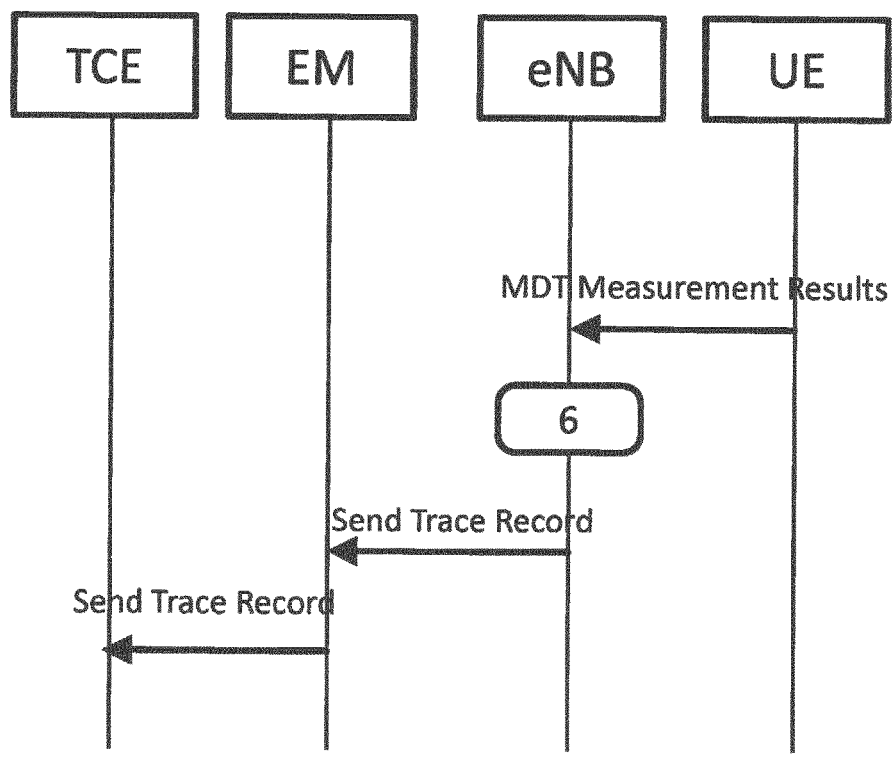
FIG. 2 shows one aspect of the prior art MDT procedure.
Figure 4:
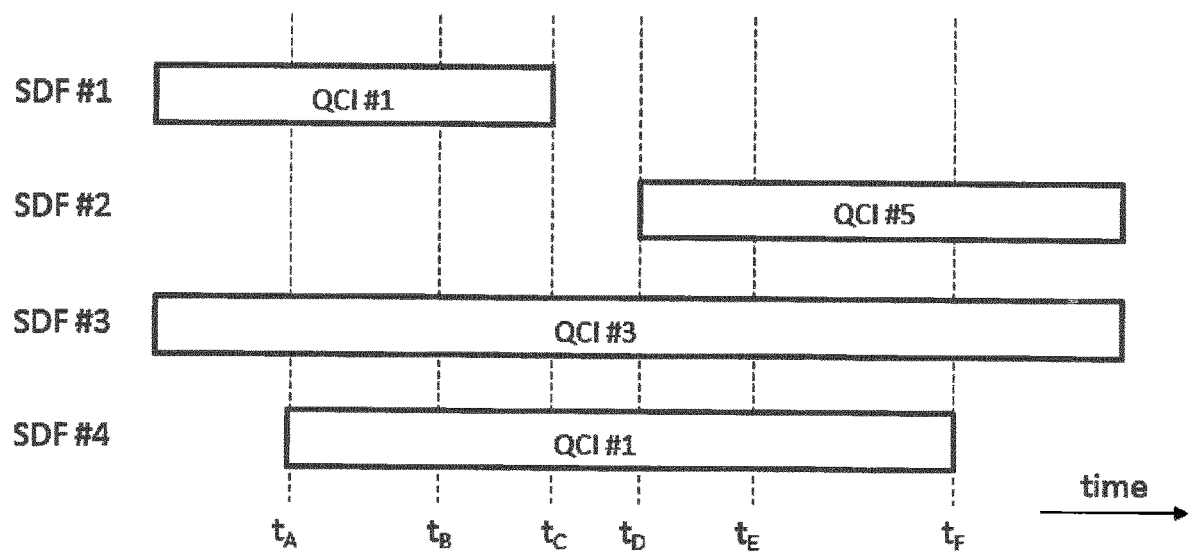
FIG. 4 illustrates multiple SDFs with respective QCIs as a function of time.

According to the state-of-art MDT deployment, MME triggers the respective eNB to start tracing a UE's (or a group of UEs') measurement(s) and the eNB configures the respective measurement(s) via appropriate RRC-level messages (cf. FIG. 1).

For enhancing MDT operation with service-level information two alternative signaling approaches are provided:

Option 1:

The existing MDT measurement configurations are enhanced to include service-level measurement descriptions.

This option is possible with the very limited changes to the current message structure. However, this would require the RRC protocol to receive and interpret service-level information that according to the ISO/OSI layer model a Radio Resource Control (RRC) protocol should not process. Further details are described below.

Option 2:

New MDT related measurement configurations are introduced at NAS (Non-Access Stratum above the radio layers) level.

This option requires a new definition of measurement elements in NAS messages and thus more impact on the current NAS signalling, which today does not know about measurements. However, the current definition of routing options per IP flow offers structures that can be enhanced with limited impact on the relevant messages.

Furthermore, the NAS protocol termination point in the CN is the MME. Further details are described below.

Option 1: Enhanced Measurement Configuration on RRC Level

This option includes service-specific measurements into existing RRC measurement configuration messages. Current measurement configuration techniques for RRM (Radio Resource Management) purposes are described in TS 36.331 § 5.5.1. In this option, additions to the respective configuration of Measurement Objects and Reporting Configurations are made.

A new Measurement Object Service Data Flow Measurements (SDF-Measurements) is introduced into the existing RRC Measurement Configuration. The object is used to configure measurements on specific flows of specific bearers (or groups of such flows). There may be exactly one new Service Data Flow Measurements object configured per SDF. The measured quantity is based on data rate (peak, mean/average), packet arrival and transmission rate (peak, mean/average) and packet size (max, min, average).

Also, we introduce new reporting configuration information that allows configuration of trigger events for reporting and description of reporting quantities.

The following descriptions of information elements contain legacy RRC configuration message content and explanatory text with the changes underlined (and removed text marked with << . . . >>). The description is done in Abstract Syntax Notation (ASN.1) language as used in the RRC specification. The content description is hierarchical, for better readability we marked in bold the references to element whose details are following further below.

The information elements provide a measurement configuration option that is as much aligned to existing configuration messages as possible. The invention is not limited to the specific signaling as other ways of communicating the same service-level measurement configuration to a UE are possible.

The current RRC measurement configuration defines separately Measurement Objects (the objects on which measurements are done, e.g. the cells to be measured) and Measurements Reports (the trigger when to report and what exactly to report). The measurement configuration combines Measurement Objects and Reports and maps such combination with a unique measurement ID. By this way it is possible to combine one measurement object with several reports, e.g. to have several triggers on the same cell measurement, and vice versa it is possible to combine one report with several objects to send the same type of report triggered by different measurements.

We align to this general approach and define measurement objects that base on EPS bearers and respective bearer ID and within EPS bearers the Service Data Flow. The Service Data Flow is derived from the existing definition of the Traffic Flow Template (for details see description of option 2), however other flow definitions may be used, indicated in the message description as a choice-construct that allows also other IDs not further discussed herein. The indication of a Service Data Flow is optional to allow measurements and triggers to be defined for the whole EPS bearer by not specifying a flow.

For the reporting we define four new events (cf. "ReportConfigEPSbearer" below), based on data rate and buffer fill level. Each event can be applied to respective objects. The following principles are applied to the inventive measurements:

If a buffer level measurement is bound to an EPS bearer as a whole, then the transmit buffer on the radio interface (namely Radio Link Control layer buffers) are measured and reported.

When buffer level measurement is used for specific flows (which are not known or distinguished on the radio interface and related buffers), then the transport layer buffers are measured and reported, e.g. TCP-buffers of respective IP-flows.

For the data rate, an interval over which the data rate is averaged could be added to the signalling. We omitted this parameter to keep examples short and assume a meaningful fixed interval, e.g. 100 msec.

The reporting configuration contains the Measurement Quantity that gives information whether data rate, bearer (layer 2) buffer and flow (layer 4) buffer should be reported. This gives the freedom to trigger reports only by one of the measurements but in case an event occurs, the report contains a choice of measurement that can be different from those triggering the report.

MeasConfig

The IE MeasConfig specifies measurements to be performed by the UE, and covers intra-frequency, inter-frequency and inter r T mobility as well as configuration of measurement gaps and EPS-bearer and service data flow specific measurements.

MeasConfig information element

```
-- ASN1START
MeasConfig ::=                          SEQUENCE {
    -- Measurement objects
    measObjectToRemoveList              MeasObjectToRemoveList          OPTIONAL,   -- Need ON
    measObjectToAddModList              MeasObjectToAddModList          OPTIONAL,   -- Need ON
    -- Reporting configurations
    reportConfigToRemoveList            ReportConfigToRemoveList        OPTIONAL,   -- Need ON
    reportConfigToAddModList            ReportConfigToAddModList        OPTIONAL,   -- Need ON
    -- Measurement identities
    measIdToRemoveList                  MeasIdToRemoveList              OPTIONAL,   -- Need ON
    measIdToAddModList                  MeasIdToAddModList              OPTIONAL,   -- Need ON
    -- Other parameters
    quantityConfig                      QuantityConfig                  OPTIONAL,   -- Need ON
    measGapConfig                       MeasGapConfig                   OPTIONAL,   -- Need ON
    s-Measure                           RSRP-Range                      OPTIONAL,   -- Need ON
    preRegistrationInfoHRPD             PreRegistrationInfoHRPD  OPTIONAL, -- Need OP
    speedStatePars         CHOICE {
        release                             NULL,
        setup                               SEQUENCE {
            mobilityStateParameters             MobilityStateParameters,
            timeToTrigger-SF                    SpeedStateScaleFactors
        }
    }                                                                   OPTIONAL,   -- Need ON
    ...,
    [[  measObjectToAddModList-v9e0     MeasObjectToAddModList-v9e0     OPTIONAL    -- Need ON
    ]],
    [[  measIdToAddModList-v12xy        MeasIdTAddModList-v12xy         OPTIONAL    -- Cond MeasId
    ]]
}
<<...>>
-- ASN1STOP
```

MeasObjectToAddModList

The IE MeasObjectToAddModList concerns a list of measurement objects to add or modify MeasObjectToAddModList information element

```
-- ASN1START
MeasObjectToAddModList ::=              SEQUENCE (SIZE (1..maxObjectId)) OF
MeasObjectToAddMod
```

| MeasObjectToAddModList information element |
| --- |
| ```
MeasObjectToAddModList-v9e0 ::=    SEQUENCE (SIZE (1..maxObjectId)) OF
MeasObjectToAddMod-v9e0
MeasObjectToAddMod ::= SEQUENCE {
    measObjectId                   MeasObjectId,
    measObject                             CHOICE {
        measObjectEUTRA                    MeasObjectEUTRA,
        measObjectUTRA                     MeasObjectUTRA,
        measObjectGERAN                    MeasObjectGERAN,
        measObjectCDMA2000                 MeasObjectCDMA2000,
        measObjectEPSbearer                MeasObjectEPSbearer,
        ...
    }
}
<<...>>
-- ASN1STOP
``` |

MeasObjectEPSbearer

The IE MeasObjectEPSbearer specifies EPS bearer and Service Data Flow specific information.

| MeasObjectEPSbearer information element |
| --- |
| ```
-- ASN1START
MeasObjectEPSbearer ::=        SEQUENCE {
    eps-BearerIdentity             INTEGER (0..15) ,
    serviceDataFlow                ServiceDataFlow    OPTIONAL,    -- Cond SeparateFlows
}
``` |

| MeasObjectEPSbearer information element |
| --- |
| ```
ServiceDataFlow ::=            Choice {
    tftPacketFilterId              INTEGER (0..15),
    otherFlowID                    INTEGER (0..15)
}
-- ASN1STOP
``` |

ReportConfigToAddModList

The IE ReportConfigToAddModList concerns a list of reporting configurations to add or modify

| ReportConfigToAddModList information element |
| --- |
| ```
-- ASN1START
ReportConfigToAddModList ::=   SEQUENCE (SIZE (1..maxReportConfigId)) OF
ReportConfigToAddMod
ReportConfigToAddMod ::=       SEQUENCE {
    reportConfigId                 ReportConfigId,
    reportConfig                   CHOICE {
        reportConfigEUTRA              ReportConfigEUTRA,
        reportConfigInterRAT           ReportConfigInterRAT,
        reportConfigEPSbearer          ReportConfigEPSbearer
    }
}
-- ASN1STOP
``` |

ReportConfigEPSbearer

The IE ReportConfigEPSbearer specifies criteria for triggering of an EPS bearer measurement reporting event. The EPS bearer measurement reporting events are labelled EN with N equal to 1, 2 and so on.

Event E1: Average data rate exceeds absolute threshold;
Event E2: Average data rate falls below absolute threshold;
Event E3: Buffer level exceeds relative threshold;
Event E4: Buffer level falls below relative threshold;

| ReportConfigEPSbearer information element |
| --- |
| ```
-- ASN1START
ReportConfigEPSbearer ::=      SEQUENCE {
    triggerType                    CHOICE {
        event                          SEQUENCE {
            eventId                        CHOICE {
                eventE1                        SEQUENCE {
                    e1-Threshold                   ThresholdDataRate
                },
                eventE2                        SEQUENCE {
                    e2-Threshold                   ThresholdDataRate
``` |

| ReportConfigEPSbearer information element |  |
|---|---|
| }, | |
| eventE3 | SEQUENCE { |
|     e3-Threshold |     ThresholdBuffer |
| }, | |
| eventE4 | SEQUENCE { |
|     e4-Threshold |     ThresholdBuffer |
| }, | |
| }, | |
| hysteresis | Hysteresis, |
| timeToTrigger | TimeToTrigger |
| }, | |
| }, | |
| reportQuantity | SEQUENCE{ |
|     datarate |     BOOLEAN, |
|     EPSbuffer |     BOOLEAN, |
|     SDFbuffer |     BOOLEAN |
| }, | |
| reportInterval | ReportInterval, |
| reportAmount | ENUMERATED {r1, r2, r4, r8, r16, r32, r64, infinity}, |
| } | |
| ThresholdBuffer ::= | ENUMERATED{ |
| |     5%, 10%, 20%, 30%, 40%, 50%, 60%, 70%, 80%, 90%, 95% |
| } | |
| ThresholdDataRate ::= | SEQUENCE { |
|     rateValue |     INTEGER (0..1023), |
|     rateUnit |     ENUMERATED { |
| |     1-kbps, 10-kbps , 100-kbps , 1-Mbps, 10-Mbps, 100-Mbps |
|     } | |
| } | |
| -- ASN1STOP | |

Option 2: New MDT Related Measurement Configurations on Service-Level

This option includes MDT/measurement related configuration information in the Session Management messages and related information elements (i.e. at NAS level).

While the invention is described with particular reference to MDT, the invention is not so limited and extends to other forms of connection measurement.

The Session Management protocol enhancements according to this invention (cf. FIG. 7) provide for example an ACTIVATE DEDICATED EPS BEARER CONTEXT REQUEST message that may contain according to this invention the novel configuration of MDT measurements to a specific bearer (so called EPS bearer) with the configuration information for which flows or groups of flows measurements have to be separately reported and/or which kind of tags have to be included into the measurement reports.

Figure 6:
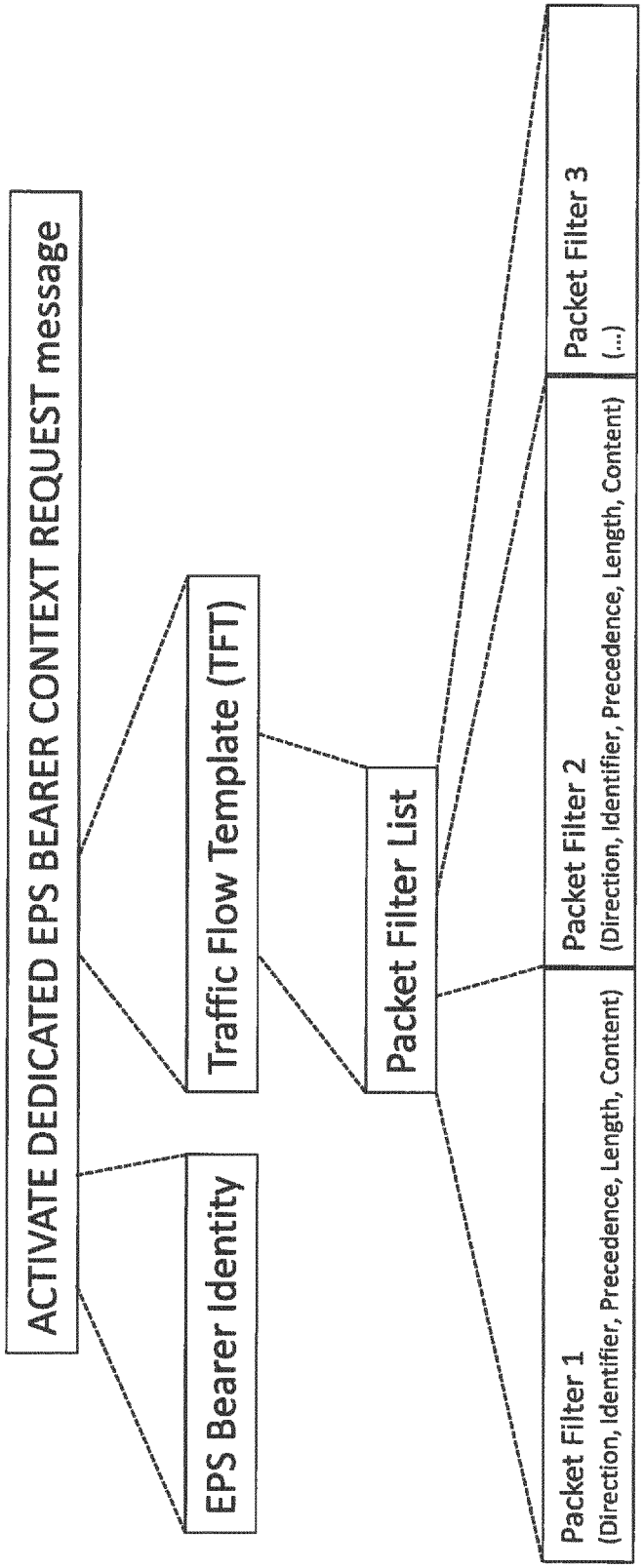
FIG. 6 shows a prior art bearer context request message.
Figure 7:
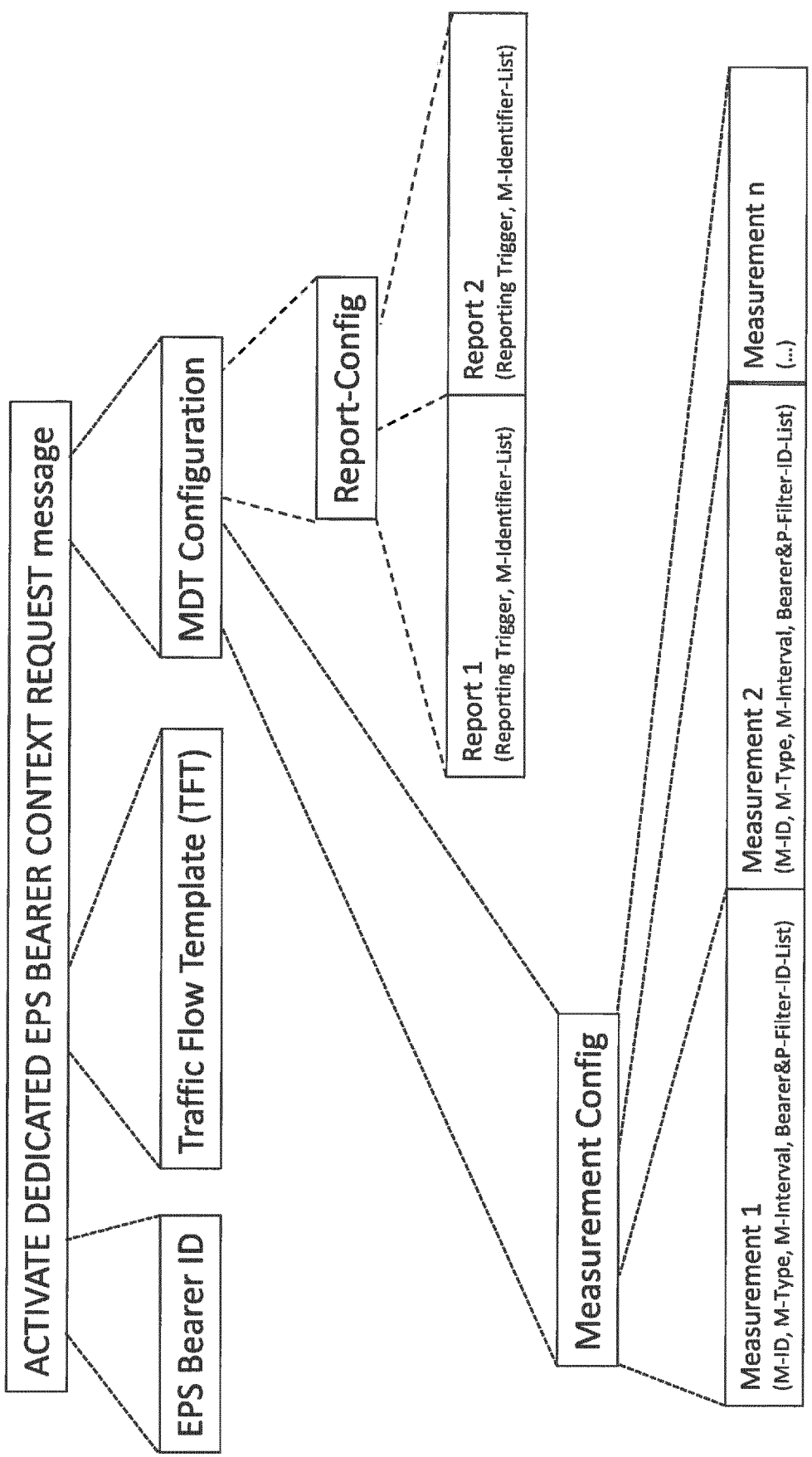
FIG. 7 shows a bearer context request message of a second embodiment of the invention.

The ACTIVATE DEDICATED EPS BEARER CONTEXT REQUEST message (and other Session Management messages) contains according to state-of-the-art an information element Traffic Flow Template (TFT) that is used for providing routing information to a UE and a PGW. For details of the respective message structure we refer to 3GPP TS 24.301 § 8.3.3 (message) and TS 24.008 § 10.5.6.12 (TFT information element). Within the TFT multiple packet filters are defined including an associated packet filter identifier for later reference. Each filter describes data flows for which a specific routing is applied. The original purpose of the TFT is not relevant to the current invention, but the description of flows including an identifier is re-used. The definition of the data flows is based on a collection of criteria parameters; examples for such criterial are source IP-address, destination IP-address, port number(s), port range(s), type of service, security parameters and flow label types. FIG. 6 shows schematically a session management message with TFT description according to the prior art and FIG. 7 shows an enhanced session management message with MDT measurements.

For an example of how the new MDT information can be conveyed to the UE efficiently, we re-use above flow definition and reference it by the packet filter identifier.

As a result the new configuration option 2 proposes a new information element within Session Management messages that references data flows utilizing the existing packet filter identifier and configures measurement collection and measurement reporting (e.g., in the scope of MDT) for the respective flows.

The proposed new MDT Configuration (at NAS layer) contains two parts, namely a definition of measurements to be performed by the UE on service-level, and a definition of reporting criteria, i.e. event triggers that initiate a report.

An example of the measurement configuration is shown in Table 4. The description uses a table form instead of the ASN.1 of option 1 as usual in the respective session management specifications.

TABLE 4

| | |
|---|---|
| Number of measurement Objects configured | Integer (1 . . . 16) |
| Measurement Object ID 1 | Integer (1 . . . 256) |
|   Number of flows to report separately | Integer (1 . . . 16) |
|     Number of flows to report in a combined manner | Integer (1 . . . 16) |
|       EPS bearer ID | Integer (0 . . . 15) |

TABLE 4-continued

| | | |
|---|---|---|
| Packet Filter ID | | Integer (0 . . . 15) |
| Measurement Object ID 2 | | Integer (1 . . . 256) |
|   Number of flows to report separately | | Integer (1 . . . 16) |
| . . . | | . . . |
| Number of measurement Reports configured | | Integer (1 . . . 16) |
| Measurement Report ID1 | | Integer (1 . . . 256) |
|   Measurement Types to report | Bitmap:<br>1 = to report, 0 = not<br>peak data rate;<br>avg data rate;<br>max packet size<br>avg packet size<br>min packet size | BITMAP (5) |
|   Measurement Interval | in 10 msec steps<br>0 means until event<br>triggered report is<br>due | Integer (0 . . . 1023) |
|   Measurement validity timer | In 50 msec steps<br>0 means until next<br>measurement<br>interval with same ID<br>expires | Integer (0 . . . 255) |
|   Measurement Trigger Event | 0 = Avg bitrate exceeds threshold<br>1 = Avg birate falls under threshold<br>2 = Peak bitrate exceeds threshold<br>3 = Peak birate falls under threshold | INTEGER (0 . . . 3) |
|   Measurement trigger threshold value | Threshold = value × unit | INTEGER (1 . . . 1024) |
|   Measurement trigger threshold unit | 0 = 1-kbps,<br>1 = 10-kbps,<br>2 = 100-kbps,<br>3 = 1-Mbps,<br>4 = 10-Mbps,<br>5 = 100-Mbps<br>6, 7 spare | INTEGER (0 . . . 7) |
| Measurement Report ID2 | | Integer (1 . . . 256) |
|   Measurement Types to report | . . . | . . . |
| . . . | | |
| Number of measurements configured | | Integer (1 . . . 16) |
|   Measurement Id 1 | | Integer (1 . . . 256) |
|   Measurement Object Id | | Integer (1 . . . 256) |
|   Measurement Report Id | | integer (1 . . . 256) |
|   Measurement Id 2 | | Integer (1 . . . 256) |
| . . . | | |

Measurements are generally taken in the UE until the measurement interval expires, in which case the measurement is stored for reporting and the next measurement cycle is started. Stored measurements are deleted after they are reported or after their validity time expires. When a measurement report is triggered, all related stored and valid measurements are reported.

The same Measurement Type, e.g. average data rate, may be configured for a number of flows. Some flows may be measured in a combined manner, so that the measurement result contains a single measurement for the data rate of multiple combine flows. According to the new measurements that distinguish services, multiple such single or combined flows can be measured separately and will lead to multiple reported measurements. This becomes evident in the nested loops of flow identifiers in the example of a MDT configuration in Table 4.

In addition to the above, the measurement configuration may be enhanced with instructions on how to deal with IP flow distribution over various data paths in a heterogeneous radio access technology environment (e.g., a 3GPP compliant access, such as the LTE Uu interface, complemented with a non-3GPP access, such as WiFi). In order to mitigate the risk of measurement falsification it is proposed to provide means to suppress collection of measurements, or to tag measurement results appropriately when multiple access systems are being used (or have been used) interchangeably to carry the IP flow under investigation, or the IP flow under investigation is/was switched from one access system to another access system.

Also, it is proposed to indicate the type of the Radio Access Technology ("access system") in which measurements for a particular IP flow are supposed to be collected (e.g., "WLAN" vs. "LTE"). An indication of the type of Radio Access Technology ("access system") in which collection of measurements for a particular IP flow are explicitly ruled out should also be possible.

The invention provides service-level measurements while keeping the impact on implementations as low as possible.

It is proposed to re-use the existing RRC-level measurement reporting method, which is also used for reporting of radio-level MDT measurements. However, an introduction of service-level specific measurements or service-data-flow identities and tags in form of RRC information elements into the Radio Resource Control (RRC) protocol messages would contradict the ISO/OSI layer model.

For the air interface we therefore propose either to use the piggybacking approach for conveying NAS messages as a whole via the RRC protocol (i.e., to introduce a "transparent container" type of information element into relevant RRC message(s)). This information element is transparent to the radio level (i.e. its content cannot be understood by the eNB) but it is meaningful at NAS level (i.e. on service level) and it can also be included into MDT reports that are further propagated from the eNB to the TCE.

An example for an enhanced MeasurementReport RRC Message according to this invention is given below. It may carry the NAS level container (cf. Table 5) transparently for the RRC protocol.

For the core network connections the same NAS level container is included into the reporting message already defined in the scope of the Trace framework to convey data (i.e. Trace Records) from the base station (eNB) to the Trace Collection Entity (TCE).

MeasurementReport

The MeasurementReport message is used for the indication of measurement results. Signalling radio bearer: SRB1

| MeasurementReport message |
|---|
| -- ASN1START |
| MeasurementReport ::=                              SEQUENCE { |
|     criticalExtensions                          CHOICE { |
|         c1                                          CHOICE{ |
|             measurementReport-r8                 MeasurementReport-r8-IEs, |
|             << ~~spare7 NULL,~~ >> |
|             measurementReport-rX                 MeasurementReport-rX-IEs, |
|             spare6 NULL, spare5 NULL, spare4 NULL, |
|             spare3 NULL, spare2 NULL, spare1 NULL |
|         }, |
|         criticalExtensionsFuture                    SEQUENCE { } |
|     } |
| } |
| MeasurementReport-r8-IEs ::=                     SEQUENCE { |
|     measResults                                 MeasResults, |
|     nonCriticalExtension                        MeasurementReport-v8a0-IEs |
|     OPTIONAL |
| } |
| MeasurementReport-v8a0-IEs ::= SEQUENCE { |
|     lateNonCriticalExtension           OCTET STRING       OPTIONAL, |
|     nonCriticalExtension               SEQUENCE { }       OPTIONAL |
| } |
| MeasurementReport-rX-IEs ::= SEQUENCE { |
|     nasMeasurementsTransparentContainer    OCTET STRING    OPTIONAL, |
|     nonCriticalExtension                   SEQUENCE { }    OPTIONAL |
| } |
| -- ASN1STOP |

Table 5 shows a Session Management (NAS) level measurement report transmitted via RRC signaling in a transparent container.

TABLE 5

| | | |
|---|---|---|
| Number of measurements reported | | Integer (1 ... 16) |
| Measurement Identifier 1 | | Integer (1 ... 256) |
| Number of separate flows or bearers reported | Order is same as in configuration | Integer (1 ... 16) |
|   Service Data Flow Identifier | | OPTIONAL (only if configured to be included) |
|   Pure/Combined Indicator | | OPTIONAL (only if configured to be included) |
|   Average Data Rate | Rate = value × unit | OPTIONAL (only if configured to be included) |
|     Rate value | | Integer (0 ... 1023) |
|     Rate unit | 0 1-kbps, | Integer (0 ... 7): |
| | 1 10-kbps | |
| | 2 100-kbps, | |
| | 3 1-Mbps, | |
| | 4 10-Mbps, | |
| | 5 100-Mbps | |
| | 6, 7 spare | |
|   Peak Data Rate | Rate = value × unit | OPTIONAL (only if configured to be included) |
|     Rate value | | Integer (0 ... 1023) |
|     Rate unit | Integer (0 ... 7): | Integer (0 ... 7) OPTIONAL |
| | 0 1-kbps, | |
| | 1 10-kbps | |
| | 2 100-kbps, | |
| | 3 1-Mbps, | |
| | 4 10-Mbps, | |

TABLE 5-continued

| | | |
|---|---|---|
| | 5 100-Mbps | |
| | 6, 7 spare | |
| Max Packet size | In 8-Byte units | Integer (0 . . . 255) OPTIONAL (only if configured to be included) |
| Average Packet size | In 8-Byte units | Integer (0 . . . 255) OPTIONAL (only if configured to be included) |
| Measurement Identifier 2 | | Integer (1 . . . 256) |
| Service Data Flow Identifier | | OPTIONAL (only if configured to be included) |
| Pure/Combined Indicator | | OPTIONAL (only if configured to be included) |
| Average Data Rate | | OPTIONAL |
| . . . . | | . . . . |

In addition to the above, in a heterogeneous access system the measurement report may be enhanced with at least one of the following indications:
 measurements were suppressed, or
 measurements might be inaccurate
due to:
 IP flow distribution over multiple access systems, or
 IP flow switching from one access system to another access system Also, in a heterogeneous access system, it is proposed to indicate in the course of configuring service-specific measurements the type of the Radio Access Technology ("access system") in which measurements for a particular IP flow are supposed to be collected, and are not supposed to be collected, respectively (e.g., "WLAN" vs. "LTE").

Also, in a heterogeneous access system, it is proposed to indicate as part of a measurement report pertinent to service-specific measurements the type of the Radio Access Technology ("access system") in which measurements for a particular IP flow were collected (e.g., "WLAN" vs. "LTE"). In one embodiment multiple measurement reports may be generated for the same IP flow, one for each radio access system being used.

The P-GW may also be involved in MDT reporting.

Figure 3:
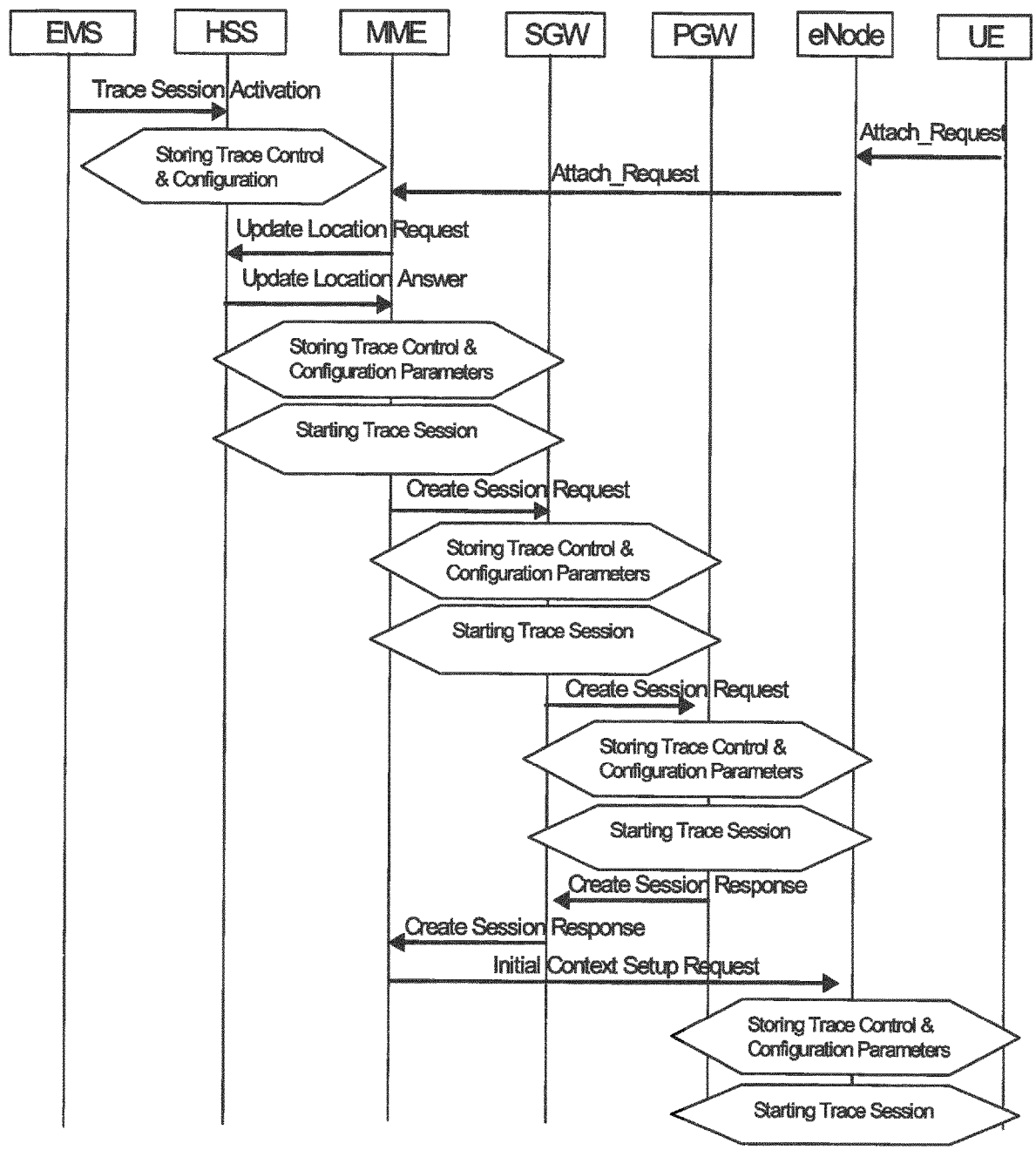
FIG. 3 shows an extract from a flow diagram from a 3GPP standard.

As depicted in FIG. 3 (prior-art) the PGW and SGW are configured with trace functionality by the MME based on geographical area or subscriber information.

In this invention the existing trace-based configuration is enhanced for collection and reporting of service-specific measurements. The enhanced configuration contains information for which separate flows measurements have to be included in the reports and if any tagging of reports with flow information is required, or (alternatively) if inclusion of service-specific events, such as start/stop indications for a particular flow) are required.

The actual description of measurements, reporting triggers and reporting quantities is basically the same as described for UE-based service-level measurements. The flow definition that is used for measurement configuration can similarly re-use the Traffic-Flow-Template (TFT) definition that is also present in the SGW and PGW Session Creation Messages.

Table 6 shows a modified version of Table 8.3.18.1 of 3GPP TS 24.301 v. 13.1.0 including an information element "MDT Config", a description of which is given in Table 7.

TABLE 6

| IEI | Information Element | Type/Reference | Presence | Format | Length |
|---|---|---|---|---|---|
| | Protocol discriminator | Protocol discriminator 9.2 | M | V | ½ |
| | EPS bearer identity | EPS bearer identity 9.3.2 | M | V | ½ |
| | Procedure transaction identity | Procedure transaction identity 9.4 | M | V | 1 |
| | Modify EPS bearer context request message identity | Message type 9.8 | M | V | 1 |
| 5B | New EPS QoS | EPS quality of service 9.9.4.3 | O | TLV | 3-15 |
| 36 | TFT | Traffic flow template 9.9.4.16 | O | TLV | 3-257 |
| 30 | New QoS | Quality of service 9.9.4.12 | O | TLV | 14-22 |
| 32 | Negotiated LLC SAPI | LLC service access point identifier 9.9.4.7 | O | TV | 2 |
| 8- | Radio priority | Radio priority 9.9.4.13 | O | TV | 1 |
| 34 | Packet flow Identifier | Packet flow Identifier 9.9.4.8 | O | TLV | 3 |
| 5E | APN-AMBR | APN aggregate maximum bit rate 9.9.4.2 | O | TLV | 4-8 |
| 27 | Protocol configuration options | Protocol configuration options 9.9.4.11 | O | TLV | 3-253 |

TABLE 6-continued

| IEI | Information Element | Type/Reference | Presence | Format | Length |
|---|---|---|---|---|---|
| C- | WLAN offload indication | WLAN offload acceptability 9.9.4.18 | O | TV | 1 |
|  | MDT Config | NEW: MDT Measurement Config | O | TLV |  |

TABLE 7

| 8 | 7 | 6 | 5 | 4 | 3 | 2 | 1 | |
|---|---|---|---|---|---|---|---|---|
| MDT Measurement Configuration IEI | | | | | | | | Octet 1 |
| Length of MDT Measurement Configuration contents | | | | | | | | Octet 2 |
| Measurement Configuration | | | | | | | | Octet 3 ... n |

The Measurement Configuration referred to in Table 7 may be that given in Table 4 ("Session Management MDT measurement configuration"). In another embodiment it may contain the one given in Table 4 either in parts or in its entirety.

Figure 8:
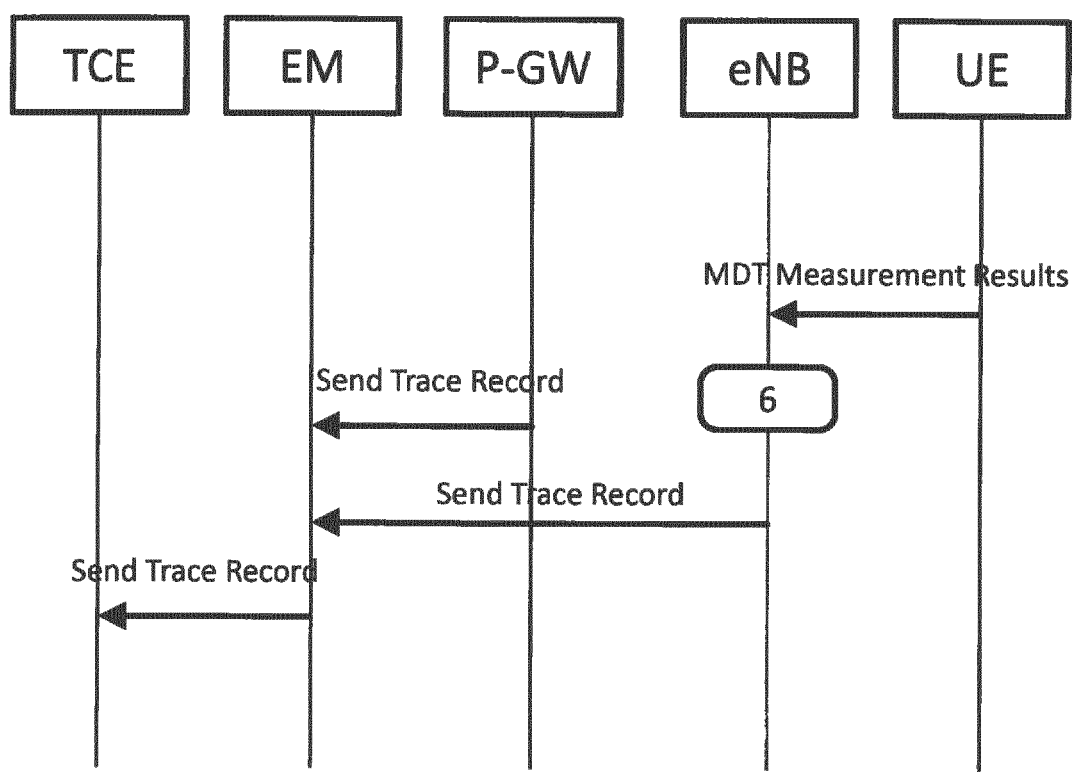
FIG. 8 shows a flow diagram of a modified reporting method of the invention.

In contrast to the UE the P-GW is a network node that can provide Trace Records directly to the Element Manager (or Trace Collection Entity) without any involvement of an aggregating node. Therefore, FIG. 8 shows a single message from P-GW to the EM.

The existing messages that are currently used in the framework of the Trace functionality to convey data (Trace Records) from the PGW to the Trace Collection Entity (TCE) are enhanced by a new service-level measurement report. The report is not shown here as it includes all the information elements that have been configured to be reported and the measurement report is build very similar to the session management transparent container in Table 4.

So far we didn't talk about how the different measurement configurations (one received for service-specific measurements at application layer, and one received for radio access related measurements at RRC layer) can be coordinated inside the UE in order to make both the measurement collection and measurement reporting more efficient.

In this section we describe interworking methods between the NAS layer and the RRC layer in the scope of the present invention.

The NAS layer collects service-specific measurement samples as configured. When a certain reporting criterion is met (e.g, when the maximum number of samples has been reached, or the maximum size of the container is met, etc.) the NAS layer passes its measurement results down to the RRC layer, potentially together with some control parameters (e.g., nature of the report, reporting urgency, etc.). The service-specific measurement results may be handed over in form of a container that is transparent for the RRC layer. Once the service-specific measurement results are received by the RRC layer, the RRC layer may either choose to combine these service-specific measurement results with the radio access related measurement results (joint reporting) in one MeasurementReport RRC Message for submission to the infrastructure side (i.e. to the base station), or it may send the service-specific measurement results and the radio access related measurement results separately (unsynchronized, or separate reporting). If the service-specific measurement results are received from the NAS layer in form of a transparent container, the UE may use piggybacking of NAS content via the RRC protocol to convey data to the infrastructure side. Otherwise the service-specific measurement results may be incorporated in a MeasurementReport RRC Message according to the ASN.1 encoding rules of the RRC protocol (although this might be regarded as a violation of the ISO/OSI protocol layer separation).

Figure 9:
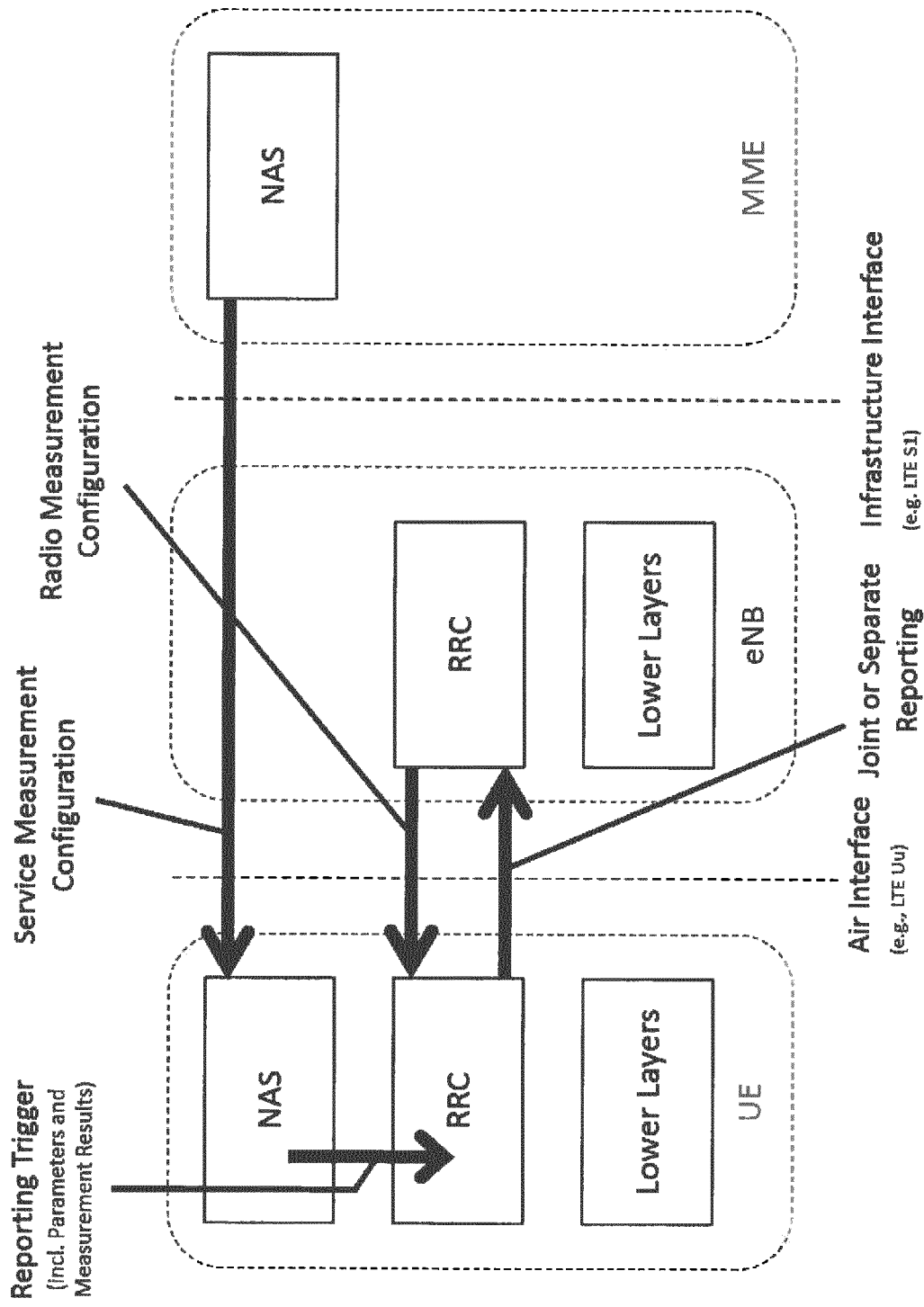
FIG. 9 illustrates a flow of messages across a mobile network.

FIG. 9 shows an example of this interworking variant.

Every time the RRC layer is about to compose a MeasurementReport RRC Message for submission of radio access related measurement results to the network, it may query the NAS layer to hand over service-specific measurement results for reporting in the same MeasurementReport RRC Message (joint reporting). The RRC layer may add some control parameters to its request to the NAS layer (e.g., in order to control the size or format of the expected NAS report, or some timing constraints for the NAS layer to provide the service-specific measurement results, etc.). The NAS layer may then choose to pass down the service-specific measurement results to the RRC layer. The service-specific measurement results may be handed over for instance in form of a container that is transparent for the RRC layer. Once the measurement results are available at the RRC layer, the RRC layer may include them into the MeasurementReport RRC Message that is in the process of being composed on UE side. If the service-specific measurement results are received from the NAS layer in form of a transparent container, the UE may use piggybacking of NAS content via the RRC protocol to convey data to the infrastructure side. Otherwise the service-specific measurement results may be incorporated in the MeasurementReport RRC Message according to the ASN.1 encoding rules of the RRC protocol (although this might be regarded as a violation of the ISO/OSI protocol layer separation).

Figure 10:
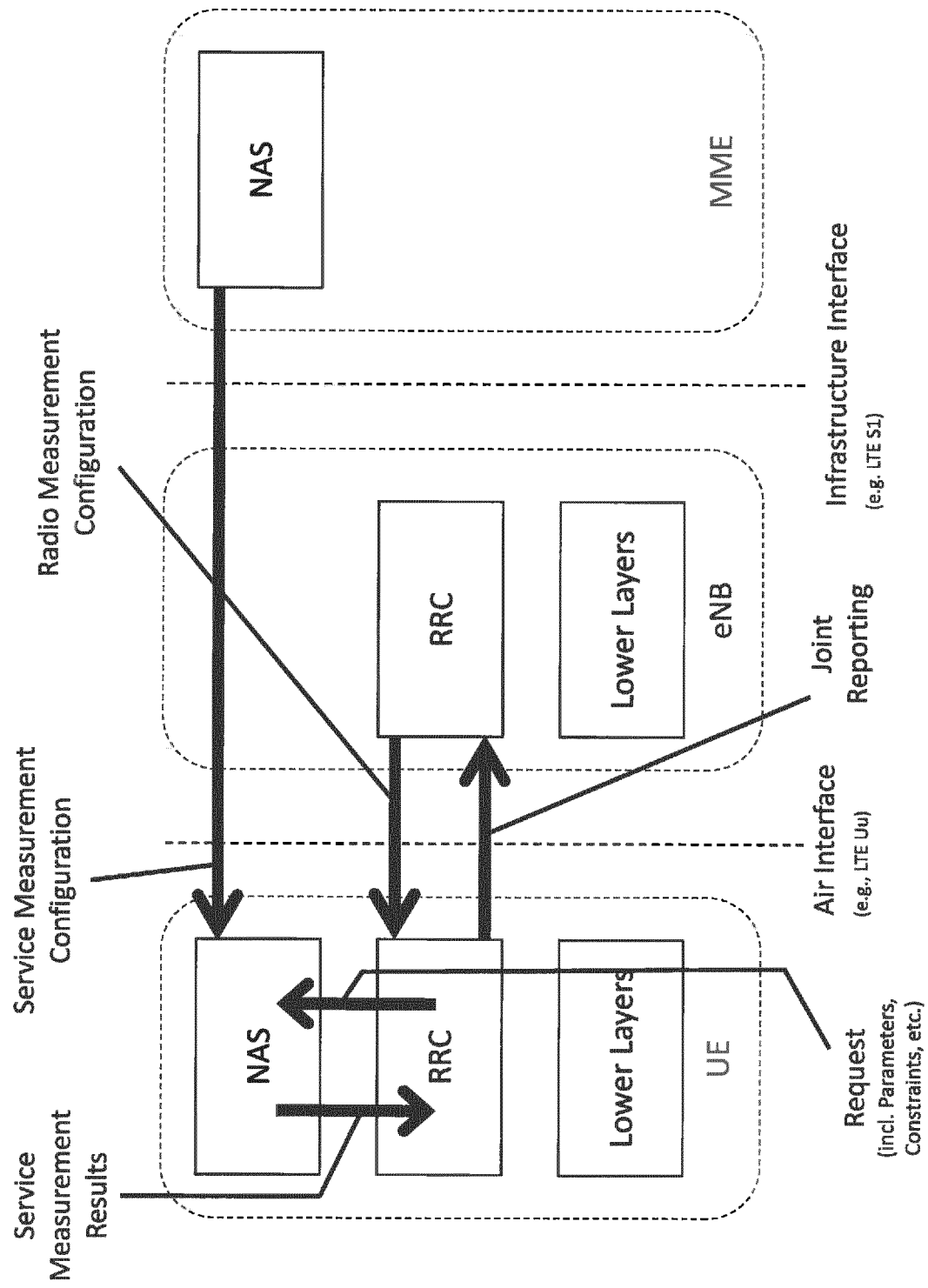
FIG. 10 shows a variant of the FIG. 9 flow.

FIG. 10 shows an example of this interworking variant. We assumed separate configurations at NAS and RRC layer, but a common measurement configuration either at NAS or at RRC layer is also thinkable (not shown in FIG. 10).

The RRC layer informs the NAS layer about reporting opportunities whereby the reporting configuration for radio access related measurement results determines reporting opportunities for service-specific measurement results collected by the NAS layer. After having been configured for the reporting of radio access related measurement results, the RRC layer informs the NAS layer about regular or sporadic reporting opportunities. The RRC layer may add some control parameters in his message to the NAS layer (e.g., parameters related to the reporting periodicity/schedule, the maximum size of the set of results to be composed by NAS, etc.). The NAS layer in turn assembles sets of service-specific measurement results that are passed down to the RRC layer, as configured by the RRC layer. The service-specific measurement results may be handed over in form of a container that is transparent for the RRC layer. Once the measurement results are received by the RRC layer, the RRC layer may include them in a MeasurementReport RRC Message. If the service-specific measurement results are received from the NAS layer in form of a transparent container, the UE may use piggybacking of NAS content via the RRC protocol to convey data to the infrastructure side.

Otherwise the service-specific measurement results may be incorporated in the MeasurementReport RRC Message according to the ASN.1 encoding rules of the RRC protocol (although this might be regarded as a violation of the ISO/OSI protocol layer separation).

Figure 11:
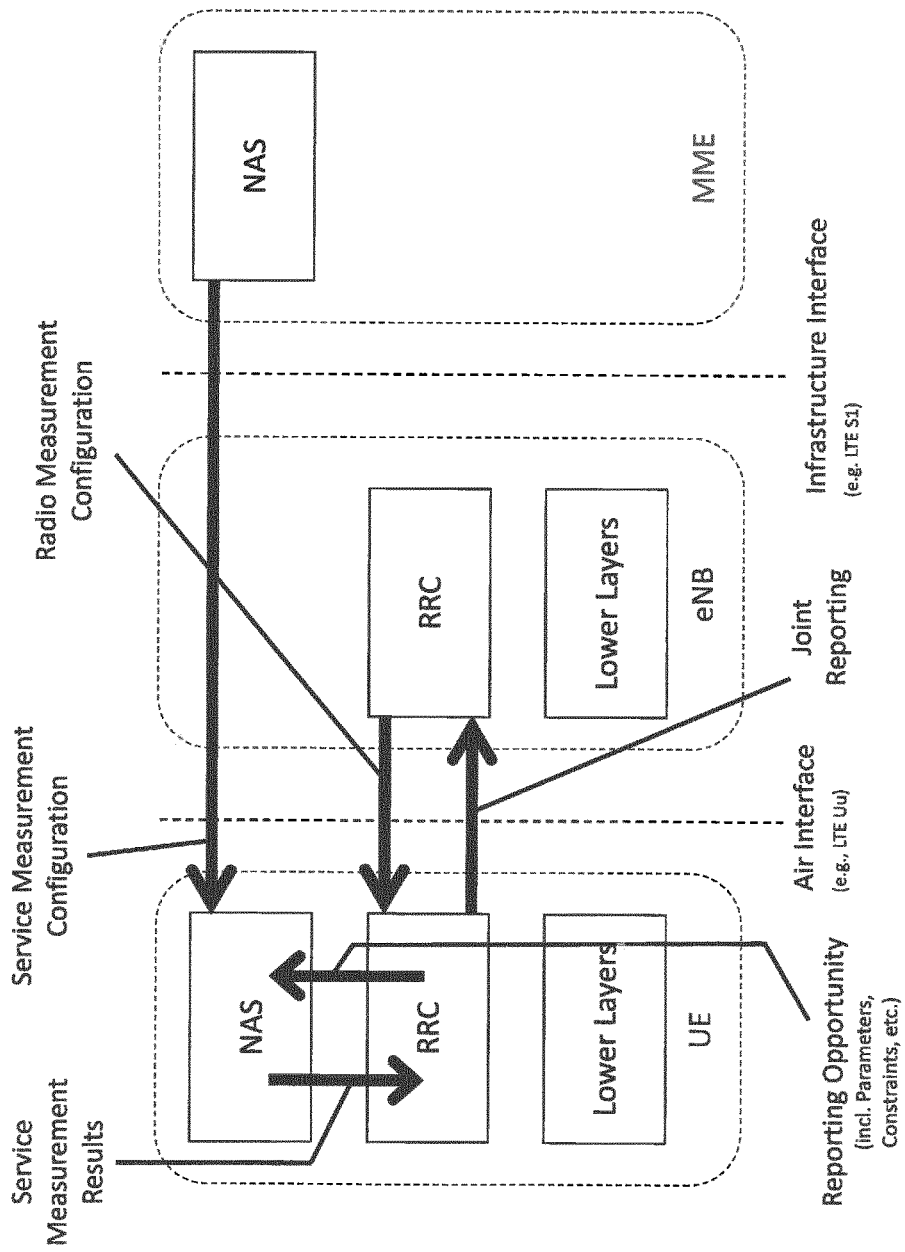
FIG. 11 shows a still further variant of the FIG. 9 flow.

FIG. 11 shows an example of this interworking variant. Here, we depict again separate configurations at NAS and RRC layer, but a common measurement configuration either at NAS or at RRC layer is also thinkable (not shown in FIG. 11).

The invention claimed is:

1. A method for a user equipment, UE, device to perform measurements in order to assess network performance, the method comprising:
  receiving configuration information at the UE device, the configuration information providing information for controlling service specific measurements for at least one radio bearer and for controlling tagging of measurement reports by the UE device with a plurality of service data flow identifiers for each radio bearer comprising at least two downlink service data flows, and
  configuring, performing and reporting the measurements on the at least one radio bearer for at least two downlink service data flows per radio bearer, wherein the reporting comprises reporting measurements for each of the at least two downlink service data flows per radio bearer individually.

2. The method of claim 1, wherein the measurements are collected at an EPS Bearer level.

3. The method of claim 1, characterized in that the service specific measurements are fully or partially configured, collected, or reported as part of a minimization of drive test, MDT, feature.

4. The method of claim 1, wherein the configuration information is included within a measurement configuration information element.

5. The method of claim 4, wherein the configuration message is one of a radio resource control message and a session management message.

6. The method of claim 4, wherein the configuration information comprises at least one of a definition of measurements to be performed by the UE device and a definition of reporting criteria.

7. The method of claim 6, wherein the reporting criteria provide trigger information when a particular event occurs.

8. The method of claim 7, wherein the particular event is at least one of an average data rate exceeding a threshold, an average data rate falling below a threshold, a buffer level exceeding a threshold, and a buffer level falling below a threshold.

9. The method of claim 4, wherein the configuration information provides information on performing measurements in the event that multiple radio access technologies are employed.

10. The method of claim 1, wherein results of the measurements are tagged with at least one identifier specifying the type of the access system that the collected measurements relate to.

11. The method of claim 1, characterized in that messages are exchanged between a non access stratum layer and a radio resource control layer, for the purpose of at least one of measurement configuration, measurement operation control, measurement collection, and measurement reporting.

12. The method of claim 11, characterized in that at least one of inter-layer measurement coordination, inter-layer measurement planning, inter-layer measurement consolidation, and inter-layer measurement reporting takes place at one of a non access stratum layer and a radio resource control layer.

13. A core network equipment or radio access network equipment, configured to:
  generate a configuration message for service specific collection of measurements for at least one radio bearer, and
  transmit the configuration message to a user equipment, UE, device, the configuration message providing information for controlling service specific measurements by the UE device, and for controlling tagging of measurement reports by the UE device a plurality of service data flow identifiers for each radio bearer comprising at least two downlink service data flows, the configuration message controlling the performing of service specific measurements on the at least one radio bearer for at least two downlink service data flows per radio bearer and the reporting of the service specific measurements, wherein the reporting comprises reporting measurements for each of the at least two downlink service data flows per radio bearer individually.

14. A method for a user equipment, UE, device to perform measurements in order to assess network performance, the method comprising:
  receiving configuration information at the UE device, the configuration information providing information for controlling service specific measurements for at least one radio bearer and for controlling tagging of measurement reports by the UE device with a plurality of service data flow identifiers for each radio bearer comprising at least two downlink service data flows, and
  configuring, performing and reporting the measurements on the at least one radio bearer for at least two downlink service data flows per radio bearer, wherein the reporting comprises reporting measurements for each of the at least two downlink service data flows per radio bearer individually.

15. A method for a user equipment, UE, device to perform measurements in order to assess network performance, the method comprising:
  receiving configuration information at the UE device, the configuration information providing information for controlling service specific measurements on data arriving at the UE device via at least one radio bearer and for controlling tagging of measurement reports by the UE device with a plurality of service data flow identifiers for each radio bearer comprising at least two downlink service data flows, and
  configuring, performing and reporting the measurements on the at least one radio bearer for at least two downlink service data flows, SDFs, per radio bearer, wherein the reporting comprises reporting measurements for each of the at least two downlink service data flows per radio bearer individually.

* * * * *